Patented July 14, 1925.

1,545,837

UNITED STATES PATENT OFFICE.

WINTHROP STANLEY LAWRENCE, OF BROOKLYN, NEW YORK, ASSIGNOR TO KAUMAGRAPH COMPANY, OF NEW YORK, N. Y., A CORPORATION OF NEW YORK.

TRANSFER INK AND METHOD OF MAKING THE SAME.

No Drawing.  Application filed September 5, 1923.  Serial No. 661,101.

*To all whom it may concern:*

Be it known that I, WINTHROP STANLEY LAWRENCE, a citizen of the United States, residing at 55 Hansen Place, Brooklyn, in the county of Kings, city and State of New York, have invented certain new and useful Improvements in Transfer Ink and Methods of Making the Same, of which the following is a specification.

This invention relates to a new and improved transfer and an ink suitable for making such transfers. These transfers are of the class in which a mark, such as a word or a design, is made upon a paper base by means of a solid and fusible ink. This transfer is placed in contact with a piece of fabric, the ink being in contact with the fabric, the transfer is then heated and pressed as by means of an ordinary flatiron, and the ink is melted and driven into or absorbed by the fabric so as to reproduce the desired word or design.

One of the objects of my invention is to produce a bright and permanent ink which will cling firmly to the fabric even if the fabric is bent, twisted or is roughly treated.

Another object of my invention is to produce a flexible ink so that the impression will be permanent and to also produce an ink having a high melting point after it has been aged so as to resist heat when the fabric is washed.

It has been well known for many years that if certain oils were blown with air under suitable conditions and heat that thickened products were produced. Among the oils which have been treated in this manner are castor oil and rapeseed oil. By suitably mixing and then treating a mixture of castor oil and rapeseed oil a product having about the consistency of molasses and a light yellow color can be secured. This product becomes gummy on standing in the air after some weeks but it does not become brittle. Such a mixture is a well known product and is largely used for coating skived skins with pyroxylin solution and hence it requires no special description.

I have found that a new and highly useful transfer ink can be made by combining 100 parts by weight of Cumar with 65 parts by weight of this oil composition made of castor and rapeseed oils as before mentioned.

To make this composition the Cumar is melted and the oil composition is stirred in until the liquid is homogeneous. The composition is kept fluid for about fifteen minutes or until the material seems to have the necessary flexibility. If the composition is not heated long enough, it becomes somewhat pasty and if it is heated too long, it becomes brittle. The period of heating which will secure the best results differs with different batches of material and testing is required for determining the proper period of heating. It is not believed that any chemical reaction takes place, but it is believed that the oil composition is dissolved in the Cumar and that when the composition is cooled that some of the castor oil separates from the solution in the form of a great many very minute drops. If the composition is kept hot too long then the separation of the oil in the fine state does not occur.

Pigments and coloring matter of various kinds including metallic powder can be used with the above mentioned composition. This composition is particularly useful in that it renders pigments such as red pigments lighter so that a red pigment appears somewhat pinkish when combined with the above composition. This is particularly useful in making bright and permanent marks on dark goods. Transfers made with this ink can be used on cotton, silk and wool hosiery, on woven cotton, woolen and silk goods, on leather, rubber and camel's-hair cloth, on linen articles, silk fabrics and the like.

Various dryers such as cobalt linoleate can be used if flexibility is not so important and quick drying is necessary.

In order to make the ink more fluid ordinary petroleum oil having a specific gravity of 0.85 can be used. To produce greater fluidity, a lower melting point, and less stickiness, a rosin ester may be added.

An important property of this ink is that the melting point is materially raised upon ageing for several weeks so that a very resistant ink is produced.

My invention is not limited to the use of Cumar as any neutral resin which will combine with processed oil could be substituted and whenever "Cumar" is used in the description or in the claims, it is intended to cover all equivalent resins. Similarly, other oils could be substituted for the oils before mentioned, but I prefer to use castor oil and rapeseed oil because they are practically neutral, stable, render the composition flexible and because they are light colored. Hence the composition produced as above mentioned is of a light color but it is believed that the minute particles of separated castor oil reflect or disperse the light so as to give the composition brilliancy, when a pigment is added.

The composition should be slowly cooled after it has been made, so as to allow the particles of oil to be formed throughout the composition, and a light-brown, gleaming, substantially opaque product is secured.

I claim:—

1. A fusible adherent and flexible transfer ink containing blown oil whose melting point is raised upon exposure to air.

2. A fusible, adherent transfer ink having a base and a series of separated oily particles.

3. A fusible, adherent transfer ink having a base comprising a saturated solution of an oil in a resin, said solution having some of said oil separated therefrom in the form of a series of small separated particles.

4. A fusible adherent transfer ink having a base comprising a saturated solution of a neutral oil in a neutral resin, said solution having some of said oil separated therefrom in the form of a series of small separated particles.

5. A fusible, adherent transfer ink having a base comprising a saturated solution of a thickened oil in a substantially neutral resin, said solution having some of said thickened oil separated therefrom.

6. A fusible, adherent transfer ink comprising a mixture of Cumar, and thickened castor oil and rapeseed oil, some of said oils forming a solution with said "Cumar," and the remainder being present as separated small particles.

7. A transfer ink having a base having coloring matter incorporated therein, said base having separated light-deflecting particles made of a material other than said coloring matter therein.

8. A method of making a transfer ink, which consists in mixing a melted resin with an oil, and cooling the mixture to cause the separation of a portion of said oil in the form of separated light-deflecting particles.

In testimony whereof I hereunto affix my signature.

WINTHROP STANLEY LAWRENCE.